US009198535B2

(12) United States Patent
Righetti

(10) Patent No.: US 9,198,535 B2
(45) Date of Patent: Dec. 1, 2015

(54) DEVICE FOR DOSING GROUND COFFEE AND MACHINE COMPRISING SUCH DEVICE

(75) Inventor: Marco Righetti, Camugnano (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 506 days.

(21) Appl. No.: 13/513,623

(22) PCT Filed: Dec. 7, 2010

(86) PCT No.: PCT/IB2010/055619
§ 371 (c)(1),
(2), (4) Date: Jun. 4, 2012

(87) PCT Pub. No.: WO2011/070502
PCT Pub. Date: Jun. 16, 2011

(65) Prior Publication Data
US 2012/0240777 A1   Sep. 27, 2012

(30) Foreign Application Priority Data
Dec. 11, 2009 (IT) ................ FI2009A0256

(51) Int. Cl.
*A47J 31/40* (2006.01)
*A47J 31/42* (2006.01)
*A47J 42/40* (2006.01)

(52) U.S. Cl.
CPC . *A47J 31/42* (2013.01); *A47J 42/40* (2013.01)

(58) Field of Classification Search
CPC ........... A47J 42/40; A47J 31/42; G07F 13/06; G07F 13/065
USPC ....... 99/280, 286, 289 R; 222/71; 241/33, 34, 241/35, 36; 221/96; 700/233
See application file for complete search history.

(56) References Cited

U.S. PATENT DOCUMENTS 3,386,666 A * 6/1968 Dore ............................ 241/33
4,274,053 A   6/1981 Ito et al.
(Continued)

FOREIGN PATENT DOCUMENTS

DE  1929247 A1  1/1970
EP  1574157 A2  9/2005
(Continued)

*Primary Examiner* — Dana Ross
*Assistant Examiner* — Lindsey C Teaters

(57) ABSTRACT

The dosing device comprises: a coffee grinder (5) for making coffee powder from coffee beans; a motor (9) for actuating the coffee grinder (5); a dosing chamber (21) wherein the coffee powder produced by said coffee grinder (5) is discharged, said dosing chamber being at least partly delimited by a first wall (33), which may be opened on command for discharging the coffee powder from the dosing chamber, and by a second wall (31), mobile by the effect of a volume variation of the coffee powder in said dosing chamber (21); an actuator (37) for controlling an opening movement of said first wall (33); an electronic control device (59 that based on the position of the second wall, causes the stop of the actuating motor (9) of the coffee grinder and the actuation of said actuator (37) for controlling the opening movement of said first wall and the discharge of the coffee powder from the dosing chamber. The second wall (31) is associated to a detection system (45) of a plurality of dosing positions of the second wall. The opening of the first wall (33) is set through the electronic control device (50), in connection with the detection system (45) and with the actuator (37), when the second wall (31) has reached one of the above dosing positions.

15 Claims, 6 Drawing Sheets

(56) References Cited

U.S. PATENT DOCUMENTS

| | | | |
|---|---|---|---|
| 4,659,023 A | 4/1987 | Frei et al. | |
| 4,681,028 A | 7/1987 | Schmed et al. | |
| 5,259,296 A | 11/1993 | Mikael et al. | |
| 7,273,005 B2 | 9/2007 | Turi | |
| 2012/0070546 A1* | 3/2012 | Tanja et al. | 426/115 |

FOREIGN PATENT DOCUMENTS

| | | |
|---|---|---|
| FR | 1518759 | 2/1968 |
| FR | 2298997 A1 | 8/1976 |
| GB | 1495893 | 12/1977 |
| GB | 2008394 A | 6/1979 |
| JP | 2001046231 A | 2/2001 |
| WO | 03038770 A1 | 8/2003 |
| WO | 2008059545 A1 | 5/2008 |
| WO | 2008074221 A1 | 6/2008 |
| WO | 2008074421 A1 | 6/2008 |
| WO | 2008105017 A1 | 9/2008 |
| WO | 2009022364 A2 | 2/2009 |

* cited by examiner

DEVICE FOR DOSING GROUND COFFEE AND MACHINE COMPRISING SUCH DEVICE

TECHNICAL FIELD

The present invention relates to the field of coffee machines and beverage vending machines, in particular of the type comprising at least one infusion unit for dispensing coffee. More in particular, the invention relates to improvements to devices for dosing ground coffee in coffee machines or vending machines, or in coffee grinders.

PRIOR ART

At present there exist automatic or semi-automatic coffee machines for professional or household use, wherein the coffee powder used for making the coffee-based drink is obtained through the grinding of coffee beans contained in a tank of the machine. In automatic drink dispensers too, or the so-called vending machines, designed for dispensing coffee or coffee-based drinks, grinding units are typically used which starting from beans contained in one or more containers produce the coffee powder that is then introduced into the infusion unit.

One of the problems that occur in these machines is that of correctly dosing the amount of coffee powder for each infusion cycle. Frequently, infusion units are such as to allow the dispensing of a single coffee cup at a time. In this case, the amount of coffee is adjusted within a limited range, typically between 6 and 9 grams per each infusion cycle. On the other hand, when the infusion unit is suitable for dispensing one or two coffee cups in a single dispensing cycle, the coffee dose may vary within a much wider range, as it must be double compared to the dose required for dispensing a single coffee cup. This requires the use of a dosing device capable of dispensing a variable coffee dose in a very wide range, from a minimum of about 6 grams to a maximum of about 18 grams.

In some coffee machines, the amount of coffee to be dosed at each infusion cycle is determined based on the rpm of the coffee grinder motor. These dosing systems are based on the fact that at each grinding revolution, a predetermined amount of coffee powder is produced. Therefore, the amount of ground coffee is about directly proportional to the number of revolutions of the motor. These systems require highly expensive electronic control motors. Also, the proportion between rpm and amount of ground coffee varies according to multiple factors, and in particular the grinder wear. It is therefore necessary to provide for dose adjustment systems since control through the motor rpm only is not sufficiently accurate. These control systems require the detection of at least one parameter, for example the current absorbed by the closing actuator of the infusion unit, and a management algorithm that can change the ratio between rpm and amount of ground coffee based on the detection of said parameter. This makes these systems quite complex and expensive. An example of such a system is disclosed in WO-A-2008/105017.

There are also systems for dosing ground coffee based on a volume criterion. These devices provide for the coffee grinder to be associated to a dosing chamber, wherein the coffee powder produced by the coffee grinder through the beans grinding is fed by the effect of the centrifuge force generated by the rotation of the coffee grinders. The dosing chamber is partly delimited by a flexible sheet, which becomes deformed, that is, moves by the effect of the build up of coffee powder in the same dosing chamber. This movement or deformation causes the actuation of a micro-switch that interrupts the grinding and controls the opening of a moving wall that typically closes the dosing chamber bottom. From the latter, the ground coffee falls by gravity into a hopper associated to the infusion unit.

In order to obtain an adjustment of the coffee amount for each dose, the micro-switch may be adjusted into position by a manual adjustment system, so it is actuated by the deformable sheet defining a wall of the dosing chamber at variable values of the volume of coffee powder built up in the dosing chamber. An example of a dosing chamber of this type is described in U.S. Pat. No. 4,659,023. This device is not capable of modifying the amount of coffee powder ground at each cycle within so wide ranges as to allow the dispensing alternately of one or two cups of coffee. Typically, in fact, these known systems allow an adjustment of the amount of coffee within a range comprised between about 7 and about 9 grams, only for the purpose of dispensing a single more or less strong dose of coffee, according to the amount of coffee set, to satisfy the user's taste.

GB-1495893 describes a dosing device, wherein systems are adopted which allow alternately dispensing a single dose or a double dose of coffee for allowing the production of a single coffee cup or two coffee cups in a single infusion cycle. To this end, the coffee grinding unit is associated to at least two dosing chambers, each of which can be set to open when a preset amount of coffee variable within a relatively limited range is reached. Depending on the number of coffee cups (one or two) that must be dispensed in a single cycle, the dosing device is controlled to discharge the coffee powder from one or both the dosing chambers provided by the device. While this known device allows greater flexibility in terms of setting of the amount of ground coffee it dispenses at each cycle, it exhibits several drawbacks. In particular, since a dual dosing chamber is required, the device is cumbersome and very expensive.

SUMMARY OF THE INVENTION

According to one aspect, the invention aims at providing a device for dosing ground coffee for an automatic or semi-automatic coffee machine, a vending machine or the like, which should all or partly overcome at least one of the drawbacks of the traditional devices.

In practice, according to embodiments of the invention, there is provided a device for dosing ground coffee in a coffee machine comprising: a coffee grinder for making coffee powder from coffee beans; a motor for actuating the coffee grinder; a dosing chamber wherein the coffee powder produced by said coffee grinder is discharged, said dosing chamber being at least partly delimited by a first wall, which may be opened on command for discharging the coffee powder from the dosing chamber, and by a second wall, mobile by the effect of a volume variation of the coffee powder in said dosing chamber; an actuator for controlling an opening movement of said first wall; an electronic control device that based on the position of the second wall, causes the stop of the actuating motor of the coffee grinder and the actuation of said actuator for controlling the opening movement of said first wall and the discharge of the coffee powder from the dosing chamber. The second wall is associated to a system for detecting a plurality of dosing positions of said second wall, and which through an electronic control unit, in connection with said detection system and with said actuator, the opening of said first wall is set when the second wall has reached one of the positions of said second wall, selectable among those of said plurality of dosing positions.

In preferred embodiments, the control unit is programmed to select a quantity of coffee powder and to control opening of said second wall when said second wall reaches a position detected by said detecting system, corresponding to said selected quantity of coffee powder. In this manner the user can input his selection of coffee powder quantity and the control unit will stop the grinder and open the dosing chamber to discharge the selected amount of coffee powder when the second wall reaches the position corresponding to the selected amount of coffee powder. Preferably, the user will not be required to input the amount of coffee expressed in grams, but rather a user-friendly interface will be provided, allowing the user to easily select either the number of cups to be brewed, or the thickness (strength) of the coffee, which depends upon the quantity of coffee per cup, or both the number of cups and the thickness of the beverage.

With a configuration of this type, on the machine wherein the dosing device is provided, it is possible to set an amount of coffee, which shall be measured in volume, variable within a very wide range. In this way, the dosing device allows dosing a single dose of coffee or two doses of coffee. Moreover, it allows setting a variable amount of coffee for each dose, for example an amount variable from about 6 to about 9 grams per each cup of coffee to be dispensed.

The device according to the invention allows therefore to perform a method, including the following steps:
selecting a quantity of coffee powder;
grinding coffee beans and collecting coffee powder in a volume-variable dosing chamber;
detecting the volume of ground coffee collected in the dosing chamber by detecting a movement of at least one movable wall of said dosing chamber;
stopping grinding and discharging the coffee powder when the volume of coffee powder in said dosing chamber has achieved the selected quantity, said volume corresponding to one of a detectable plurality of positions of said movable wall.

Therefore, with the method and the device of the invention it is possible to set both a variable number (1 or 2) of coffee cups, and the amount of coffee powder for each cup, adjusting it to the user's taste.

For example, thanks to the fact that the wall movable by the effect of the volume variation of coffee powder in the dosing chamber may take on various positions within a very wide range and to the fact that the control system allows the opening of the dosing chamber for at least two or three positions, also substantially different, of the above wall, the user may set the dispensing of a single coffee cup or two coffee cups in a single cycle, since the dosing device can dispense variable coffee doses, for example between six grams and eighteen grams. Coffee doses comprised between 6 and 9 grams are used for dispensing a single coffee cup. The user may set the amount of coffee for the single dose within an adequately wide range. When one wants to dispense two coffee cups in a single cycle, a double coffee dose is required, which for example may vary between 12 and 18 grams, or preferably between 14 and 18 grams, always to satisfy the taste needs of the users who may want two more or less strong coffee cups.

According to a preferred embodiment of the invention, the system for detecting a plurality of dosing positions comprises a position or movement detector, for example an encoder. The encoder may be of the optical type, with an emitter and a receiver. As an alternative, a capacitive or magnetic encoder may be used, or any other system suitable for detecting a movement or a position. If the encoder detects a movement, the encoder signal may be associated to a position of the moving wall by simply providing a step of reset of the movement measurement. The detection may also occur through a mechanical system, with a rotating encoder fitted with a shaft with a pinion that meshes with a toothing constrained to the moving wall of the dosing chamber. Using an encoder it is possible to adjust the coffee dose in a substantially continuous manner in a range comprised between a minimum dose and a maximum dose.

According to a different aspect, the invention relates to an automatic or semi-automatic coffee machine, a vending machine or other machine provided with an infusion unit for making coffee based drinks and comprising a dosing device of the type described above. The dosing device may also be used in combination with a coffee grinder, for example for professional use.

Further advantageous features and embodiments of the invention are described hereunder and are indicated in the claims which form an integral part of the present description.

BRIEF DESCRIPTION OF THE DRAWINGS

The invention will be better understood by following the description and accompanying drawing, which shows a non-limiting practical embodiment of the invention. More specifically, in the drawing.

DETAILED DESCRIPTION OF AN EMBODIMENT OF THE INVENTION

Figure 1:
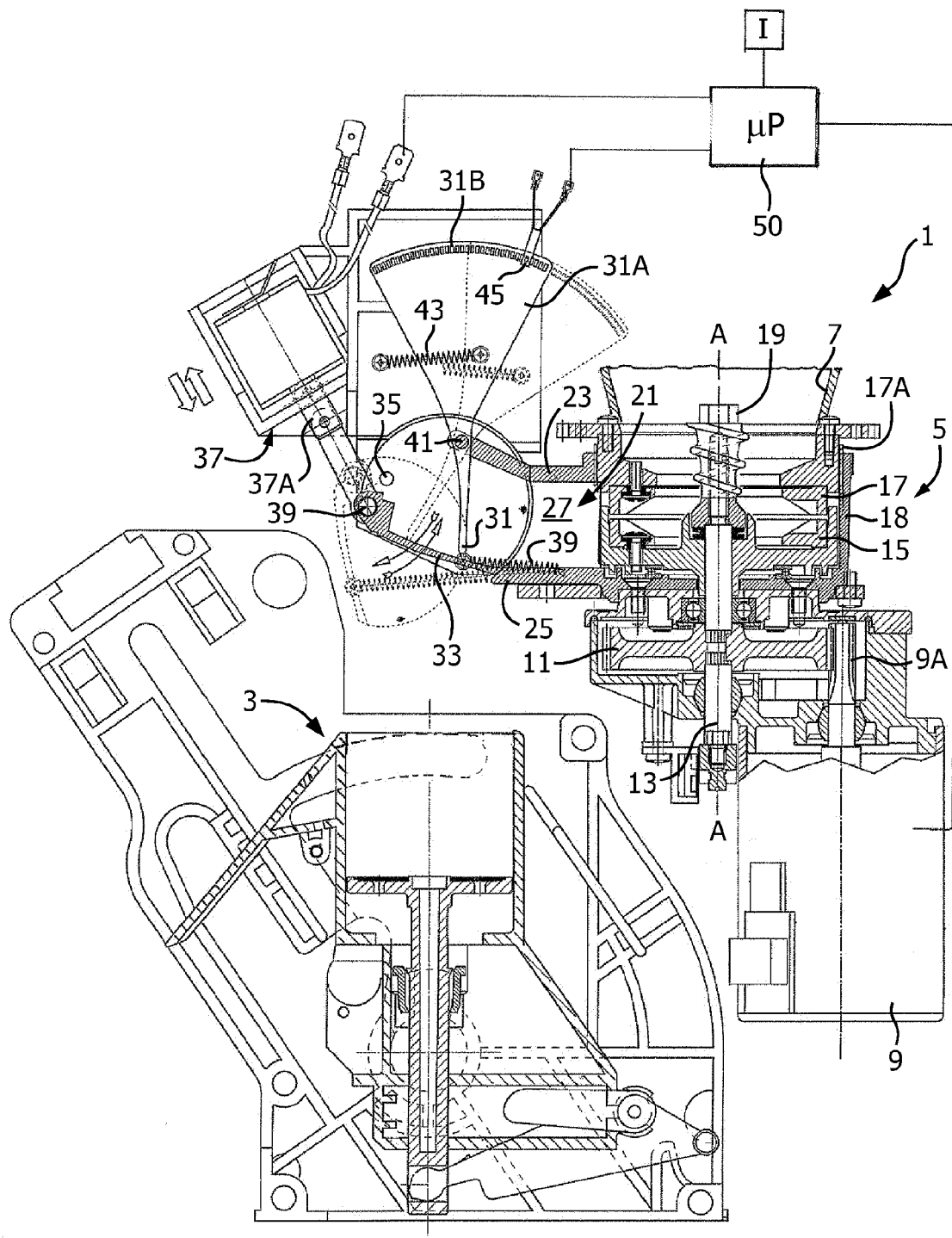
FIGS. 1 to 4 show subsequent steps of the filling of the dosing chamber of a device according to the invention in a first embodiment.

With reference to the annexed FIGS. 1 to 4, reference numeral 1 indicates the device for dosing ground coffee according to the invention, comprising the coffee grinder and arranged on top of an infusion unit 3. The infusion unit 3 may be of the known type, and for example made as described in U.S. Pat. No. 4,681,028; U.S. Pat. No. 5,259,296; EP-A-1,574,157; WO-A-2008/074421; WO-A-2009/22364 or in any other suitable manner. The coffee grinder, schematically indicated with reference numeral 5, may be made for example as described in WO-A-2008/59545 or U.S. Pat. No. 7,273,005. The documents mentioned above are an integral part of the present description.

The infusion unit as well as the coffee grinder shall not be described in detail herein as it is understood that they may be of any suitable type.

On top of the coffee grinder 5 there is arranged a hopper 7 wherein the coffee beans coming from an overlying container (not shown) are fed. The coffee grinder 5 comprises an electrical motor 9 with a motor shaft 9A fitted with a pinion meshing with a toothed wheel 11 keyed on a control shaft 13 of the coffee grinder 5. A circular or disk-shaped grinder 15 is keyed on shaft 13 and cooperates with a fixed, i.e. non-rotating, counter grinder 17, for example carried by a structure 18. The reciprocal distance between grinder 15 and counter grinder 17 may be adjusted in a per se known manner through a screw system, not described in greater detail. In brief, and as is known to those skilled in the art, the counter grinder 17 may be moved close or away to/from grinder 15 through a movement of rotation about the common axis of grinder and counter grinder, coinciding with axis A-A of shaft 13. This movement causes approaching or distancing of the counter grinder 17 relative to grinder 15 thanks to a threading 17A integral with the counter grinder 17 and engaging with a corresponding threading on the fixed structure 18. Shaft 13 is torsionally coupled with a screw 19 that picks up the coffee beans from hopper 7 and feeds them towards the grinding space contained between grinder 15 and counter grinder 17.

The grinding volume defined between grinder 15 and counter grinder 17 is in communication with a dosing chamber 21. The dosing chamber 21 is closed by a top wall 23 and by a bottom wall 25 as well as by side walls 27 substantially parallel to the plane of the figures. At the opposite end relative to the coffee grinder, the dosing chamber 21 is closed by a wall 31 movable due to the effect of the variation of the volume of coffee powder that builds up in the dosing chamber 21, as better described hereinafter. In addition to bottom wall 25, the bottom zone of the dosing chamber 21 is also closed by a wall 33 that may be controlled to open, through the opening of which the coffee powder ground by coffee grinder 5 and built up in the dosing chamber 21 is discharged by gravity from the dosing chamber 21 to the underlying infusion unit 3.

The opening wall 33 is hinged at 35 to the fixed structure of the device and may oscillate about pin 35 by the effect of the control obtained through an electromagnet 37. The moving anchor 37A of electromagnet 37 is hinged at 39 to the opening wall 33 so the retraction of anchor 37A into electromagnet 37 causes the opening wall 33 to pivot in the opening direction as better described hereinafter. The opening wall 33 is stressed into the closed position through an elastic member 39, for example a tension spring fixed at an end to the opening wall 33 and at the opposite end to a fixed point of the dosing device 1.

Wall 31 moving by the effect of the variation in the volume of coffee powder in the dosing chamber 21 is integral with a member shaped as a partition or diaphragm 31A that allows detecting the position or movement of wall 31. According to the embodiment shown in the drawing, partition or diaphragm 31A is provided with a series of windows 31B aligned with each other along a circumference arc having the centre on the axis of a rotation pin 41 whereto the moving wall 31 is hinged to pivot under the thrust of the coffee powder that builds up in the dosing chamber 21. The moving wall 31 is stressed by a pulling member, for example a tension spring 43, into a position of maximum approach to the coffee grinder 5, a position shown in FIG. 1. The tension spring 43 is to this end constrained at an end to partition or diaphragm 31A and at the opposite end, to a fixed point of the structure of the dosing device 1. Windows 31B are separate from one another by respective solid zones of diaphragm 31A. When diaphragm 31A pivots about the axis of pin 41 integrally with wall 31 by the effect of the coffee powder that builds up in the dosing chamber 21, windows 31B move between the emitter and the receiver of an optical sensor globally indicated with reference numeral 45 in the drawing. The emitter emits a light beam that is detected by the receiver and modulated by the effect of the passage between receiver and emitter of windows 31B separated by the solid portions of diaphragm 31A. In this way, through the receiver-emitter system 45 it is possible to detect the angular movements of wall 31 under the thrust of the coffee powder that builds up in the dosing chamber 21.

The device described herein operates as follows.

In FIG. 1, the device is shown in the initial condition before starting a grinding cycle of the coffee beans contained in hopper 7 coming from an overlying tank or container, not shown. In this position, the moving wall 31 is in the position of maximum approach to grinder 15 and to the counter grinder 17 and the dosing chamber 21 has the minimum volume.

Figure 2:
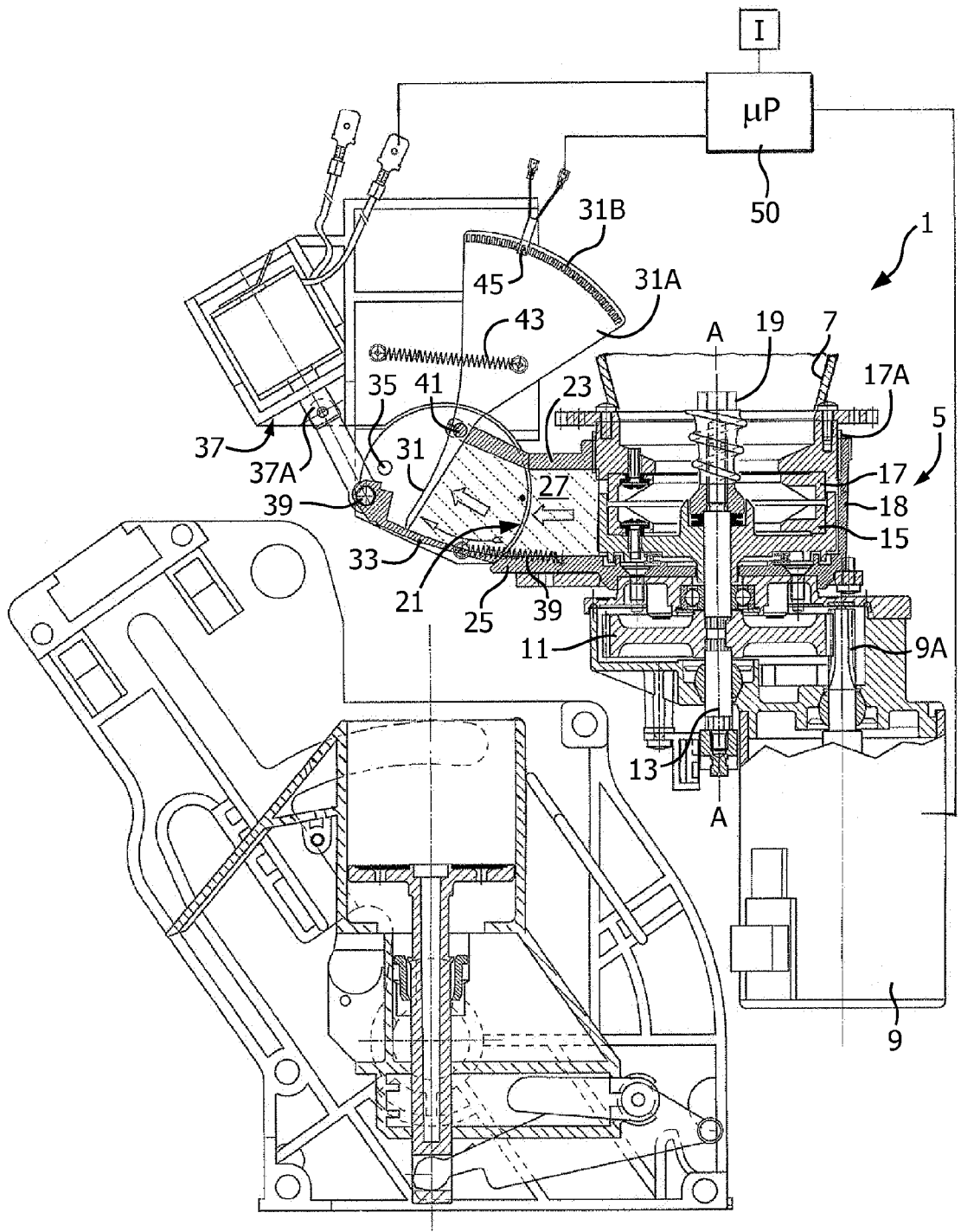

FIG. 2 shows a completion step of the filling of dosing chamber 21 with a coffee dose, for example required for the infusion of two relatively weak coffee cups, typically 15-16 grams of coffee. The coffee powder ground by coffee grinder 5 is pushed inside the dosing chamber 21 and against wall 31 by the effect of the centrifugal force due to the rotation of grinder 15. As increasing amounts of coffee powder build up gradually, this thrust causes the clockwise movement (in the drawing) of wall 31 with rotation about the axis of pin 41. This rotation movement is detected by the encoder formed by partition or diaphragm 31A with windows 31B and by the optical sensor or detector 45 comprising the optical emitter-receiver pair.

When the amount of coffee set by the user has built up in the dosing chamber 21, the rotation of motor 9 of the coffee grinder unit 5 must be stopped and the bottom opening wall 33 must be opened to discharge the coffee dose in the underlying infusion unit 3. The coffee amount is set by the user through an interface schematically indicated with I in FIG. 1, connected to an electronic control unit, for example to the microprocessor, indicated with reference numeral 50. The latter is in turn connected to encoder 31A, 31B, 45 and to electromagnet 37. A certain dose of coffee (for a single coffee cup or for a double coffee cup) set by the user corresponds to a predetermined angular position of the moving wall 31, detectable by encoder 31A, 31B, 45. Between the angular position of the moving wall and the amount of coffee powder there is a substantially constant, known and preset bi-univocal relationship, stored for example as a table within a permanent memory associated to the control unit 50. When the user selects the amount of coffee to dispense a single weak, medium or strong coffee cup or two weak, medium or strong coffee cups, the control unit 50 determines the angular position that the moving wall of the dosing chamber 21 must reach so that the desired amount of coffee powders builds up therein.

Figure 3:
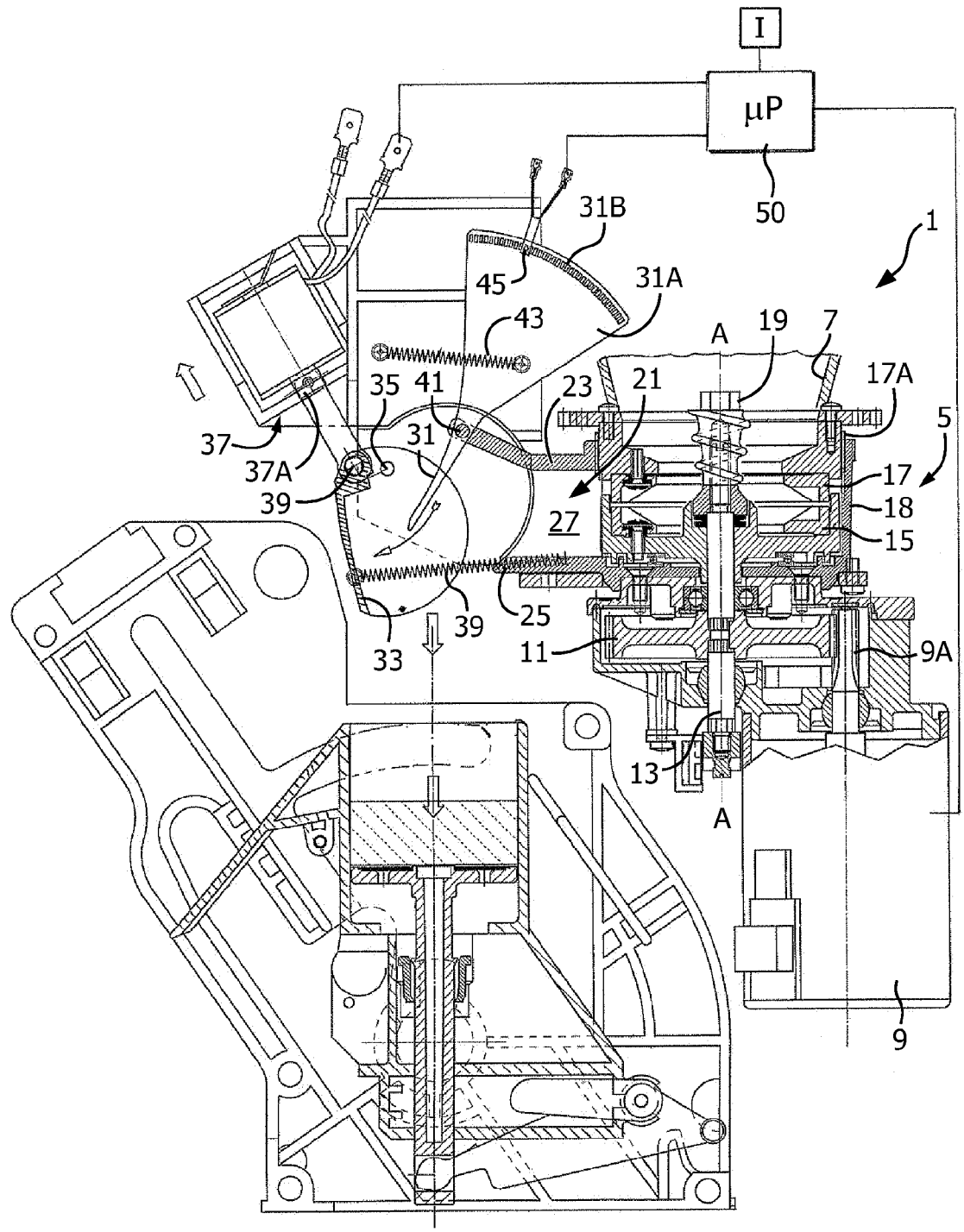
Figure 4:
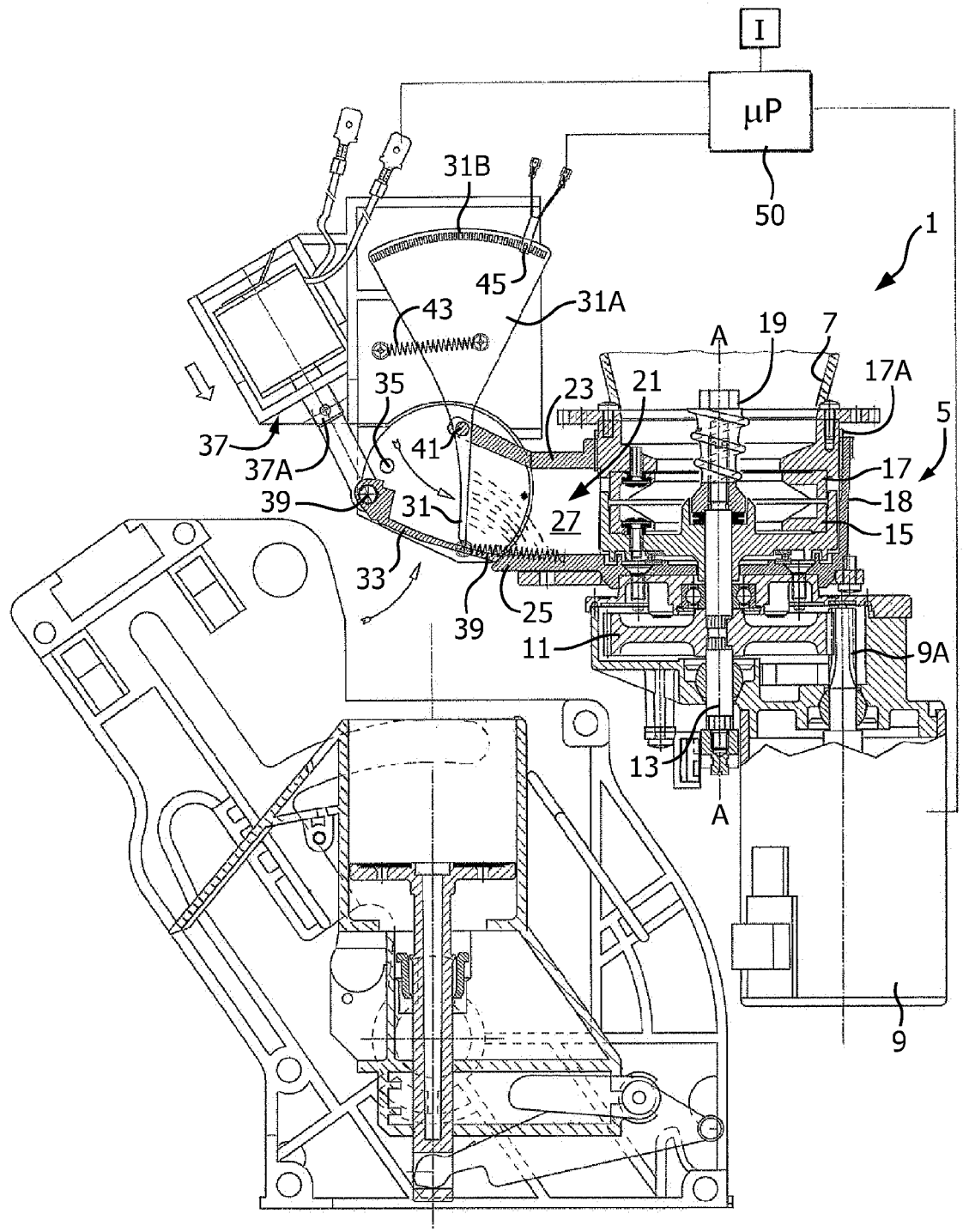

Once such position has been reached, as determined through encoder 31A, 31B, 45, the control unit 50 controls the stop of motor 9 and the excitation of electromagnet 37 that makes the opening wall 33 oscillate in open position, as shown in FIG. 3. This causes the fall by gravity (arrow FC) of the ground coffee from the dosing chamber 21 into the underlying infusion unit 3.

Using a position or movement encoder, it is possible to set a predetermined dose within a minimum and maximum range, with a very small pitch, equal to the encoder resolution degree, so that in practice it is possible to obtain a virtually continuous variation of the coffee amount in the above range.

In this step, in order to facilitate the drop of coffee that has built up against the inner surface of the moving wall 31, the latter may be held into open position for example by a second electromagnet, not shown. As an alternative, the positions of pins 41, 39 and of walls 31 and 33 may be selected so that the return movement, by the effect of the return spring 43, of the moving wall 31, does not hinder the drop of the coffee powder from the dosing chamber 21, but rather it may help to push the coffee downwards, discharging it from the bottom opening of the dosing chamber 21.

When the coffee powder has been completely discharged towards the underlying infusion unit 3, the dosing device 1 can return to the initial position (FIG. 4) to start receiving the coffee powder ground at a subsequent grinding cycle.

In the configuration described so far, the encoder allows reading the angular position, or the angular movement of wall 31, in a substantially continuous manner. The dimension and the inter-distance or pitch between windows 31 B are such as to allow an adequate resolution in the reading of the angular position. However, in simpler although less advantageous embodiments, it is also possible to replace this continuous reading with a series of targets, that is, of positions transducers or sensors distributed along the trajectory whereon wall 31 or a member stiffly constrained thereto moves, for determining the achievement of a preset position selected among a plurality of user-selectable positions. For example, it is possible to provide for only two detectable positions, corresponding to a single coffee dose and to a double coffee dose, or two pairs or two triples of positions: in the case of two pairs of positions, the first pair may correspond to a single strong or weak dose and the second pair to a double strong or weak dose. In the case of two triples of positions, the three positions of the first triple may correspond to a single weak, medium or strong coffee dose and the three positions of the second triple may correspond to a double weak, medium or strong coffee dose. In other embodiments, it is possible to provide two sensors suitable for detecting a position corresponding to a single dose and to a double dose, respectively. Each sensor may in turn be adjustable into position for allowing the dispensing of a single, more or less charged dose, that is, more or less abundant of powder, or a double, more or less charged, dose of coffee.

In the above, explicit reference was made to the application of the dosing device of the present invention in a coffee machine for household or professional purpose or in a vending machine. However, it should be understood that the device may also be used in combination with a simple coffee grinding machine, for dispensing the predetermined coffee dose for example in a filter of a professional machine or of a manual-type household machine. Also in this case, the advantage obtained is to be able to dispense variable coffee doses.

Figure 5:
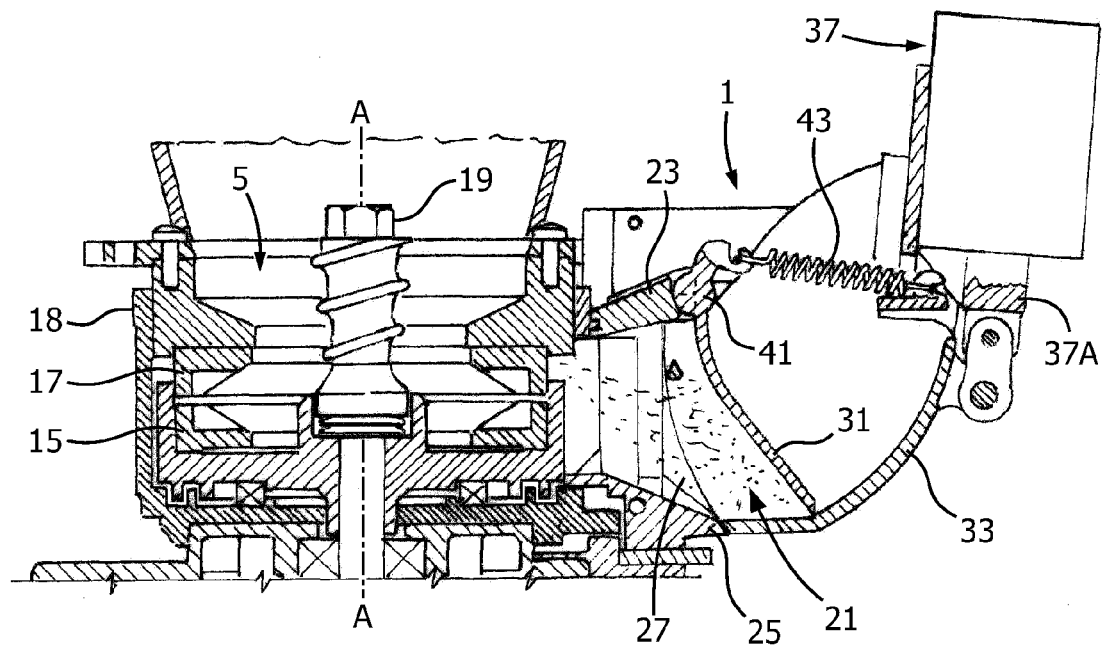
FIGS. 5 and 6 show cross sections of two different positions of a device according to the invention in a second embodiment.
Figure 6:
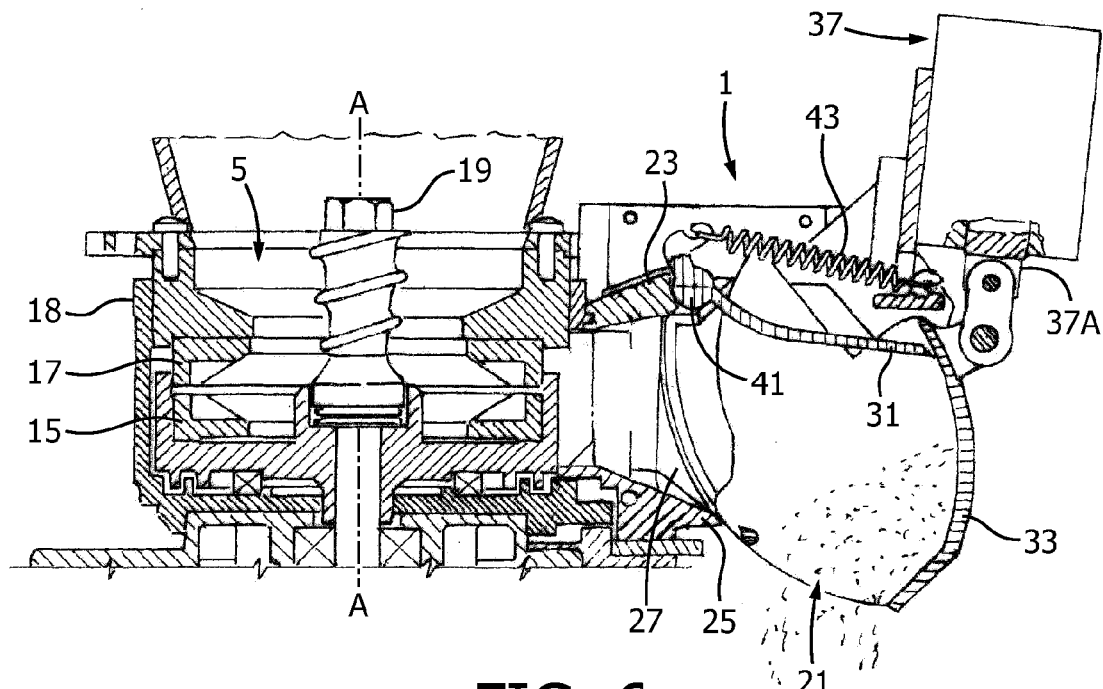
Figure 7:
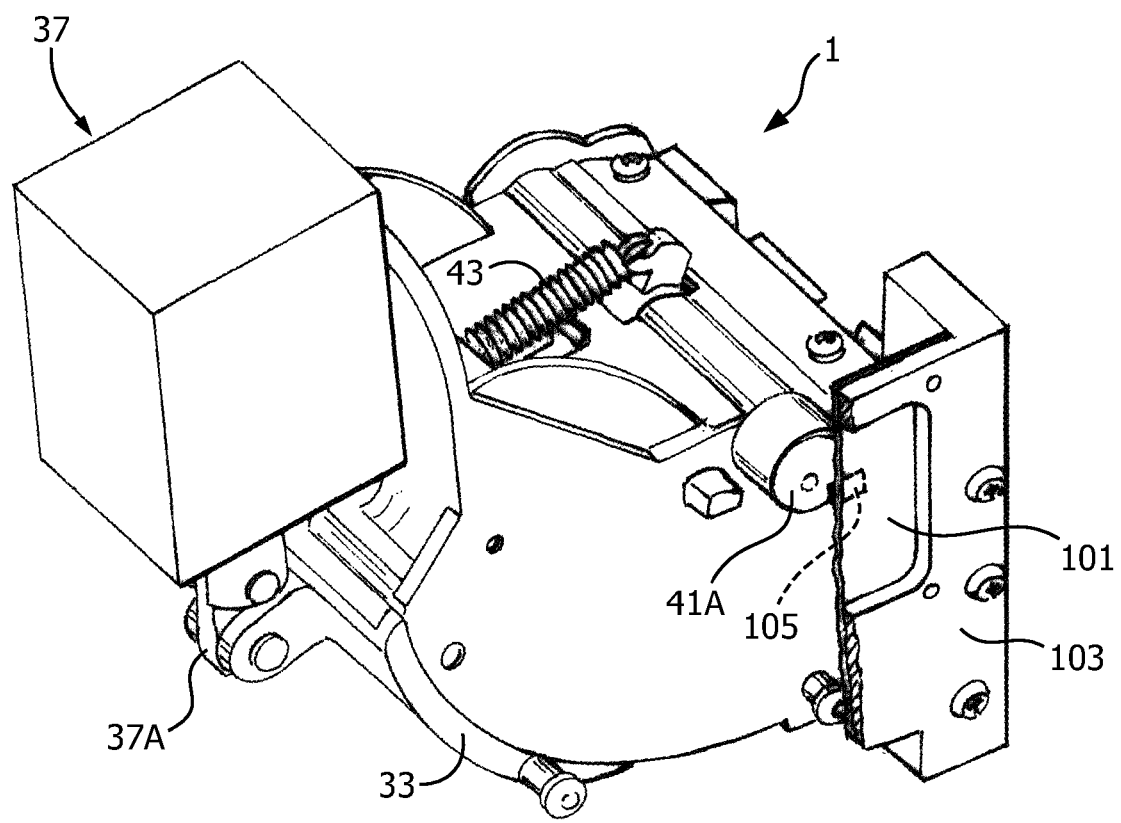
FIG. 7 shows an axonometric view of the device of FIGS. 5 and 6.

FIGS. 5 to 7 show a different embodiment of invention. Same or corresponding parts, elements or devices are indicated with the same reference numbers. More specifically, FIG. 5 shows a cross section of the device when the dosing chamber is empty and the bottom thereof is closed, FIG. 6 shows the device during the phase of discharging the coffee powder from the dosing chamber.

The coffee grinder 5 substantially corresponds to grinder 5 described in connection with FIGS. 1 to 4. The dosing device includes a dosing chamber again shown at 21. The dosing chamber 21 is closed by a top wall 23 and by a bottom wall 25 as well as by side walls 27 substantially parallel to the plane of the figures. At the opposite end relative to the coffee grinder, the dosing chamber 21 is closed by a wall 31 movable due to the effect of the variation of the volume of coffee powder that collects in the dosing chamber 21, as described above. The bottom area of the dosing chamber 21 is also closed by a movable wall 33 that may be controlled to open in order to discharge the ground coffee from the dosing chamber 21 to an infusion device arranged under the dosing device 1 and not shown.

The opening wall 33 is hinged to the fixed structure of the device and is pivoted by means of an electromagnet 37. The moving anchor 37A of the electromagnet 37 is hinged at 39 to the opening wall 33 so the refraction of anchor 37A into electromagnet 37 causes the opening wall 33 to pivot in the opening direction as described above. The opening wall 33 can be stressed into the closed position (FIG. 5) by an elastic member, not shown, for example a spring arranged around the pivoting axis of the wall 33.

The moving wall 31 is stressed by a pulling member, for example a tension spring 43, into a position of maximum approach to the coffee grinder 5, as shown in FIG. 5 The tension spring 43 is to this end constrained at an end to partition or diaphragm 31A and at the opposite end, to a fixed point of the structure of the dosing device 1.

In the embodiment of FIGS. 5 to 7 the optical encoder of FIGS. 1-4 is replaced by a magnetic rotatory encoder including a rotary magnet arrangement and a sensor. In the embodiment shown the magnetic arrangement is housed in an expansion 41A of the rotation pin 41, see in particular FIG. 7. The expansion 41A faces an electronic card 101 supported by a frame 103 and supports a magnetic sensor 105 substantially coaxial to the rotation pin 41 and the expansion 41A thereof. The rotation of the moving wall 31 is thus magnetically detected. The arrangement of the magnetic encoder results in an extremely compact and reliable device.

It is understood that the drawing shows just one example, provided merely as a practical demonstration of the invention, which can vary in its forms and arrangements, without however departing from the scope of the concept underlying the invention. Any reference numbers in the appended claims are provided to facilitate reading of the claims with reference to the description and to the drawing, and do not limit the scope of protection represented by the claims.

The invention claimed is:

1. A device for dosing ground coffee comprising:
   a coffee grinder for producing coffee powder from coffee beans;
   a motor coupled to drive the coffee grinder when actuated;
   a dosing chamber arranged to receive the coffee powder during actuation of said motor, said dosing chamber including;
      a first wall controllably operable to open and release the coffee powder from the dosing chamber; and
      a second wall moveable to enlarge the volume of the dosing chamber to correspond with a volume of the coffee powder received from the coffee grinder;
   a wall-opening actuator operably connected to open the first wall upon actuation;
   a detection apparatus configured and arranged for non-contactually detecting a plurality of predetermined dosing positions of said second wall representative of different respective volumes of the dosing chamber; and
   a control unit electrically connected to control actuation of the motor and actuation of the wall-opening actuator to open the first wall and electrically connected to the detection apparatus, said control unit being operable to stop actuation of the motor and to open the first wall when the detection apparatus indicates that the second wall has reached a selected one of the plurality of predetermined dosing positions.

2. A device according to claim 1 where the detection apparatus comprises a movement detector.

3. A device according to claim 1 where the detection apparatus comprises an encoder.

4. A device according to claim 3 where the encoder comprises an optical detection system including an optical emitter and an optical receiver, where said second wall is integral with an intercepting diaphragm provided with a plurality of windows adjacent to one another and spaced apart by solid zones of said intercepting diaphragm, said diaphragm being positioned for moving between said optical emitter and said optical receiver; and said rotation of said second wall causing modulation of an optical signal by the effect of the passage of said windows and of said solid zones of the intercepting diaphragm between said optical emitter and said optical receiver.

5. A device according to claim 3 where the encoder comprises a magnetic rotary encoder.

6. A device according to claim 5 where the magnetic rotary encoder includes a rotary magnet arrangement rotatable integrally with said second wall around a mutual pivoting axis.

7. A device according to claim 3 a dose of coffee selectable in a substantially continuous manner in a predetermined range can be set through said electronic control device.

8. A device according to claim 1 where the detection apparatus comprises an angular encoder arranged for rotation around a common axis with the second wall.

9. A device according to claim 1 including an elastic return member arranged to counteract a force exerted against the second wall by the coffee powder volume that collects within said dosing chamber.

10. A device according to claim 9 where the second wall and an axis about which said second wall rotates are arranged so that a rotational movement of said second wall caused by said elastic return member pushes the coffee powder to exit the dosing chamber when the first wall is open.

11. A device according to claim 10 including a temporary stopping element for keeping the second wall in an open position during the discharge of the coffee powder from said dosing chamber.

12. A device according to claim 1 where the wall-opening actuator comprises an electromagnet having a moving anchor and where said first wall is attached to said moving anchor for oscillating about a rotation pin under the control of the electromagnet.

13. A coffee machine comprising a coffee bean container, an infusion unit and a dosing device for dosing ground coffee comprising:
　a coffee grinder for producing coffee powder from coffee beans;
　a motor coupled to drive the coffee grinder when actuated;
　a dosing chamber arranged to receive the coffee powder during actuation of said motor, said dosing chamber including:
　　a first wall controllably operable to open and release the coffee powder from the dosing chamber; and
　　a second wall moveable to enlarge the volume of the dosing chamber to correspond with a volume of the coffee powder received from the coffee grinder;
　a wall-opening actuator operably connected to open the first wall upon actuation;
　a detection apparatus configured and arranged for non-contactually detecting a plurality of predetermined dosing positions of said second wall representative of different respective volumes of the dosing chamber; and
　a control unit electrically connected to control actuation of the motor and actuation of the wall-opening actuator to open the first wall and electrically connected to the detection apparatus, said control unit being operable to stop actuation of the motor and to open the first wall when the detection apparatus indicates that the second wall has reached a selected one of the plurality of predetermined dosing positions.

14. A beverage vending machine comprising a coffee bean container, an infusion unit and a dosing device for dosing ground coffee comprising:
　a coffee grinder for producing coffee powder from coffee beans;
　a motor coupled to drive the coffee grinder when actuated;
　a dosing chamber arranged to receive the coffee powder during actuation of said motor, said dosing chamber including;
　　a first wall controllably operable to open and release the coffee powder from the dosing chamber; and
　　a second wall moveable to enlarge the volume of the dosing chamber to correspond with a volume of the coffee powder received from the coffee grinder;
　a wall-opening actuator operably connected to open the first wall upon actuation;
　a detection apparatus configured and arranged for non-contactuallity detecting a plurality of predetermined dosing positions of said second wall representative of different respective volumes of the dosing chamber; and
　a control unit electrically connected to control actuation of the motor and actuation of the wall-opening actuator to open the first wall and electrically connected to the detection apparatus, said control unit being operable to stop actuation of the motor and to open the first wall when the detection apparatus indicates that the second wall has reached a selected one of the plurality of predetermined dosing positions.

15. A coffee grinder comprising a coffee bean container, a ground coffee dispenser and a dosing device for dosing ground coffee comprising:
　a coffee grinder for producing coffee powder from coffee beans;
　a motor coupled to drive the coffee grinder when actuated;
　a dosing chamber arranged to receive the coffee powder during actuation of said motor, said dosing chamber including;
　　a first wall controllably operable to open and release the coffee powder from the dosing chamber; and
　　a second wall moveable to enlarge the volume of the dosing chamber to correspond with a volume of the coffee powder received from the coffee grinder;
　a wall-opening actuator operably connected to open the first wall upon actuation;
　detection apparatus configured and arranged for non-contactually detecting a plurality of predetermined dosing positions of said second wall representative of different respective volumes of the dosing chamber; and
　a control unit electrically connected to control actuation of the motor and actuation of the wall-opening actuator to open the first wall and electrically connected to the detection apparatus, said control unit being operable to stop actuation of the motor and to open the first wall when the detection apparatus indicates that the second wall has reached a selected one of the plurality of predetermined dosing positions.

* * * * *